3,421,097
LASER AMPLIFIER HAVING ANGULARLY DISPOSED REFLECTION REDUCING END SURFACE
Charles J. Koester, South Woodstock, Conn., and Elias Snitzer, Sturbridge, Mass., assignors, by mesne assignments, to American Optical Company, Southbridge, Mass., a corporation of Delaware
Filed Mar. 25, 1963, Ser. No. 267,711
U.S. Cl. 330—4.3                6 Claims
Int. Cl. H01s 3/00

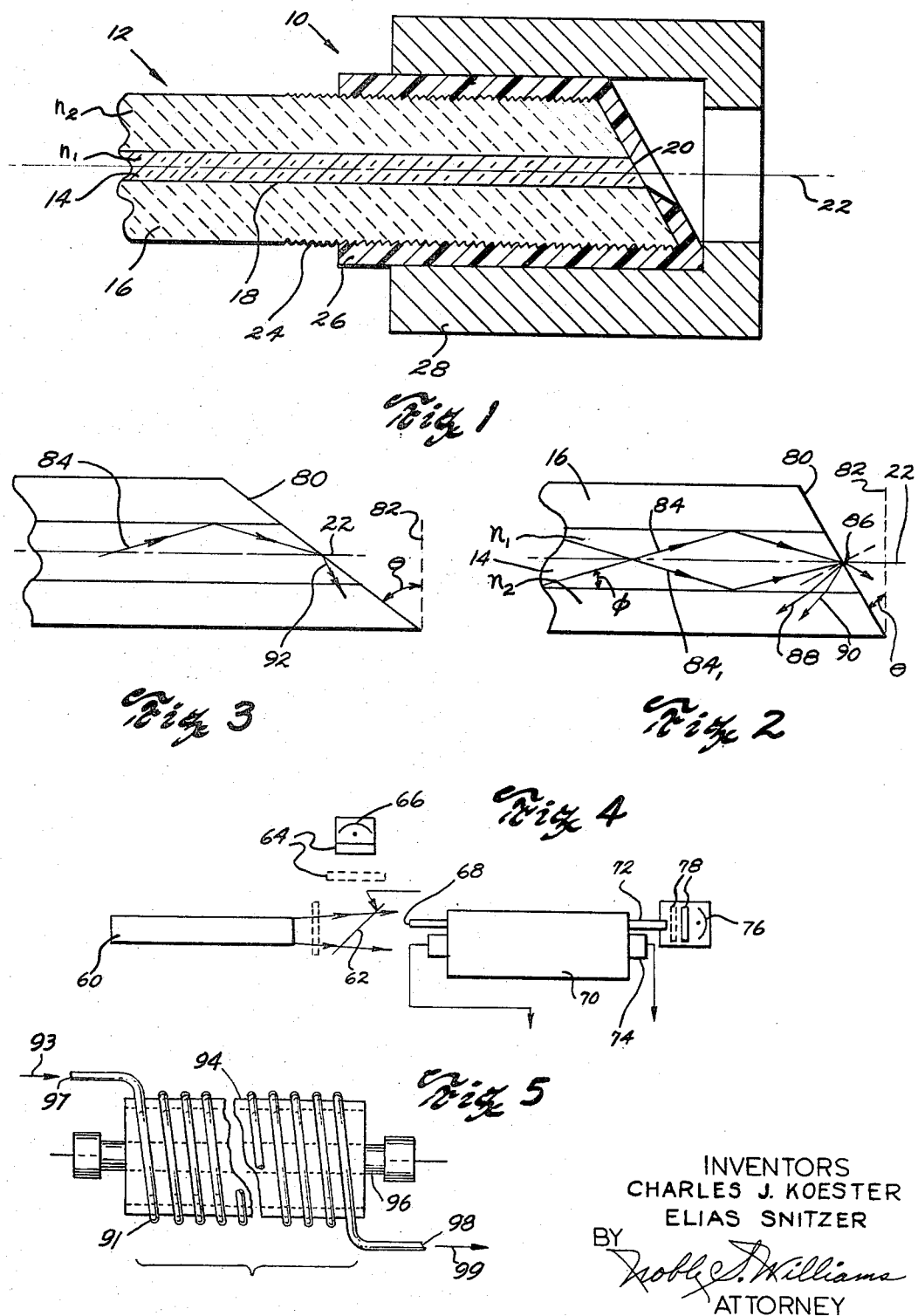

ABSTRACT OF THE DISCLOSURE

Elongated laser amplifier construction comprising thin, elongated core of solid, moldable laser material and cladding of solid, moldable, transparent material of lesser index than that of core and having, one or both end surfaces thereof, optically finished and predeterminedly sloped or bevelled in accordance with the core and cladding index relationship therebetween to provide increased light amplification.

---

This invention relates to improvements in laser constructions and more particularly to improvements in laser constructions for providing and controlling gain or light-amplification provided thereby. The word "light" as used above and also throughout the specification and claims which follow is to be taken in its generic sense so as to mean not only energy within the visible region of the electromagnetic spectrum but also within the infra-red and ultra-violet regions as well.

It has already been disclosed in co-pending Snitzer application Ser. No. 168,012, and assigned to the assignee of this application, filed Jan. 16, 1962, that a light signal traveling through a fiber optical communication line can be directed therefrom directly into and through an elongated fiber laser component of suitable construction and configuration optically coupled therewith in such a manner as to have this signal amplified by the stimulated emission of said laser component duing optical pumping thereof. This earlier fiber laser amplifier was constructed in the form of a relatively thin, long fiber-like component arranged in the shape of a helical coil of many similar convolutes disposed about and in relatively close relation to an elongated tube-type pumping light source of high intensity and the arrangement was such that each individual convolute thereof received nearly the same amount of pumping light from said light source and, accordingly, functioned as a travelling-wave-type of light-amplifier for the optical signal beam directed into one end thereof and being emitted in amplified form from the opposite end thereof.

While a certain amount of light signal amplification can be obtained by such a fiber laser construction, it has now been discovered that a much greater gain or power amplification of such a signal, for example, can be obtained if due and careful consideration is given to the manner in which the input and output ends of a laser component are constructed and arranged to receive the incoming signals and to emit the outgoing amplified signals therefrom.

It has been found that in order to obtain materially increased optical gains and also a greater and more stable band width at such high optical gain than has been possible heretofore, it is desirable to reduce the reflectance at one or even both end faces of such a laser amplifier component in a manner presently to be described.

It has also been found that in cases wherein the laser amplifier component is provided with a transparent cladding in surrounding and optical contacting relation therewith, as for example in the case wherein the laser component is a fiber-like element and, therefore, in need of the strength and support which will be provided by such a cladding, that this cladding may be conditioned upon its outer surface at least at locations near its entrance and exit ends either by roughening of the suface thereof or the roughening and opaque coating of the roughened surface to scatter and/or absorb any stray light which may be travelling within the cladding; and by so doing, possibly further increase the optical gain or amplification obtainable therefrom or reduce the chances of this stray light acting as optical noise upon the amplified signal emitted from said component.

It is, accordingly, an object of the present invention to provide a laser amplifier in the form of a relatively long, thin component of transparent material of a predetermined refractive index and containing an active laser ingredient, and to provide upon one or both ends thereof one or a pair of light-transmitting flat end surfaces which are each so angularly disposed relative to the respective ends and transverse planes passing therethrough that any portion of the light travelling within the component and incident upon either end surface and thereafter reflected therefrom back into the component will be directed at such an angle as to be prevented from being totally internally reflected by side wall portions thereof, and also that said flat end surfaces will be disposed in such angular relation to said transverse planes as not to be equal to or exceed the angle at which light within the component will be totally internally reflected by said flat end surfaces.

It is also an object of the invention to provide in combination with such a laser component a cladding of transparent material surrounding said component in intimate optical contact therewith at at least areas adjacent the opposite ends of said component and to provide means upon the surface of said cladding material adjacent said ends for scattering and/or absorbing stray light which may be travelling in the said cladding and possibly tending to reduce the amplification factor or gain to be provided by said amplifier or add to the optical noise of said amplified signal.

Other objects and advantages of the invention will become apparent from the detailed description which follows when taken in conjunction with the accompanying drawings wherein:

FIG. 1 is a fragmentary longitudinal sectional view of an end portion of a laser amplifier and showing details thereof;

FIGS. 2 and 3 are diagrammatic sketches for use in explaining operative conditions of a laser amplifier;

FIG. 4 is a diagrammatic sketch showing means for measuring the optical gain obtained by a laser amplifier; and FIG. 5 is a fragmentary and partially broken away side elevational view of a helically-shaped fiber laser amplifier structure embodying the present invention.

Referring to the drawings in detail and in particular FIGURE 1, it will be seen that there is generally indicated at 10 a laser amplifier comprising a laser component 12 with said component being formed by a thin, elongated core of transparent material 14 of predetermined refractive index $n_1$, and containing a predetermined amount of an active laser ingredient therein, and surrounded by a cladding 16 of transparent material of a lower predetermined refractive index $n_2$ which is in intimate optical contacting relation with side wall portions of said core so as to provide an interface 18 therebetween. Upon the end of the elongated laser component is provided, as shown at 20, a flattened end surface arranged in angular relation relative to the longitudinal axis 22 of said component for purposes which will be presently described. Upon at least an end portion of this cladding, there is indicated at 24 a roughened condition so that light travelling within the cladding will be scattered and also, when desired, a coating of opaque material 26 may be applied to the outer surface thereof to aid in absorbing as much of this scattered light as possible before same is able to reach the flattened end surface of the component and escape therefrom, since such might otherwise be liable to act as optical noise and interfere with the signal being obtained from the amplifier. When desired, a supporting cap 28 may be secured to the end of the assembly for mounting purposes or the like. Of course, openings would be provided in the opaque coating 26 and in the cap 28 to allow entrance or exit of the optical signal being amplified.

In the construction shown in FIGURE 1, the core 14 and cladding 16 may be, for example, in the form of a fiber laser of small cross-sectional size and material length and, in such a case, the cladding may constitute a structural element for the fiber laser element or core 14. In fact, fiber laser constructions have been used wherein the length of the clad fiber was in the order of 1 meter and formed of neodymium laser glass core of a diameter approximately equal to 10 microns and surrounded by a cladding of a transparent material having a diameter within a range from 0.75 to 1.5 mm. and had that part intermediate the opposite ends formed into the shape of a helix having in the neighborhood of 15 to 20 convolutes in concentric relation with a pumping light source therefor.

In the case wherein the laser amplifier component is of sufficient transverse size to sustain itself without injury during its intended use, no cladding need be employed intermediate its opposite ends even though it might be preferable for mounting purposes or the like to provide a cladding material at each end thereof. Of course, such a rod or shaft of laser material could then have intermediate its opposite end air or gas, or even a liquid or a vacuum, as the cladding material for the side wall portions thereof. In many instances, however, a cladding material may be desirable in order to assure that the side wall portions of the laser component are kept clear from dust, dirt, foreign matter and the like but, in all cases, this cladding material will be of a lower refractive index than the laser component. Of course, it will be appreciated that the word "transparent" as used above with reference to the component 14 and the cladding 16 would mean in the former instance transparent to the optical energy being amplified thereby, and with reference to the cladding would mean transparent to optical energy of wavelengths being employed for pumping purposes, and the laser wavelength as well.

It has already been stated above that it is desirable to reduce as much as conveniently possible the reflectance at the opposite ends of the laser component so that the gain or amplification obtainable will be at a relatively very high value. This will be evident if reference is made to the following formula:

$$G_{max} = \frac{1}{\sqrt{R_1 R_2}} \quad (1)$$

where $R_1$ and $R_2$ are the reflectances of the end surfaces of the laser component and $G_{max}$ is the maximum net optical gain of the amplifier after inherent internal losses such as scattering and absorption have been taken into account, defined as the ratio of the intensity of the amplified light divided by the intensity of incident light.

The nature of a laser is such that if the pumping power is increased, with a corresponding increase in gain per pass of the optical energy through the component to such a degree that the gain per pass exceeds the loss per pass, then the laser will begin to oscillate. Expressed mathematically, oscillation will occur when the gain, G, per pass times the reflectance, R, of each end face equal to or greater than unity. If the pumping power is increased beyond this threshold condition wherein oscillation begins, the laser will merely oscillate more strongly, without any substantial increase in the gain, G, or signal amplification. That is, the additional pumping power goes into oscillation output power, which often occurs in the form of random spikes, rather than into the desired signal amplification. Therefore, $G_{max}$ is equal to $1/R$. Further, if the reflectance of the two ends are not equal, then the maximum gain G is given by Equation 1. It follows from this formula that reducing the reflectance at either end will result in improved optical gain obtainable from the amplifier.

One important use to which such laser amplifiers can be put is in the field of greatly amplifying signals of small magnitude such as a signal obtained from a satellite in the study of space technology, and in such cases a fiber laser component would probably be used. Since it is a rather difficult task to be able to accurately measure the optical energy of such an input signal being projected into the end of a fiber laser amplifier, and when it is desired to know the approximate optical gain or amplification being obtained by use of said amplifier, for example, in the order of 10 microns in diameter, there is shown in FIGURE 4, apparatus whereby an optical signal may be measured after passing through the laser component when no amplification is being provided thereby and also compared with such a signal which has passed through the laser component while being amplified thereby. The apparatus is also such as to enable a monitoring and evaluating of the input signal during both measurements mentioned above, when desired. In the construction shown in FIGURE 4, the element 60 serves diagramatically as a means for supplying a monochromatic input laser light, in this instance a neodymium glass laser having a 1.06 micron emission, serving as an optical input signal source and arranged in alignment therewith is a beam splitter or the like 62 which directs a fractional part of the incoming energy laterally outwardly of the main beam so as to pass through one or more filters 64 of suitable filtering characteristics before impinging upon a monitoring phototube 66.

A part of the remainder of this incoming signal, however, is directed into the entrance end 68 of the fiber optical laser amplifier unit generally indicated at 70 and which would be of such emission characteristics as to amplify in this 1.06 micron region and the output end thereof is indicated at 72. The pumping light source arranged in close proximity to this fiber laser amplifier is indicated at 74 and between the photomultiplier 76 aligned with the output end of said laser amplifier are also positioned one or more optical filters 78 of suitable characteristics for controlling the output intensity and characteristics of the signal before reaching photomultiplier 76, whether said signal is in an amplified or un-amplified condition.

In FIGURE 2, there is diagrammatically indicated an optically finished flat end surface 80 which is disposed at an angle $\theta$ relative to a transverse plane 82 adjacent an end of the laser amplifier. If either ray 84 or $84_1$ is considered to be of maximum angular value $\phi$ relative to the side walls and also the optical axis of the component which can be transmitted through said component in accordance with the index $n_1$ of the component and index $n_2$ of the cladding or surrounding medium, it will be seen that each of these rays at the location 86 at which they impinge upon the end face 80 should be at an angle of incidence that that part which is reflected by said end face back into said component should be at such an angle as to pass from the core 14 into the cladding or surround of lower refractive index and thus not be allowed to travel back through the core and have a detrimental effect upon the optical energy therein. Such reflected rays which are thus ejected from the core are indicated by arrows 88 and 90. On the other hand, the angular value of the sloping end surface 80 relative to the transverse plane 82 should not be so great as to cause total internal reflection of the ray 84 at the end face 80, as indicated by angle $\theta'$ and ray 92 in FIG. 3.

The limited numerical aperture NA for meridional rays in a core of index $n_1$, surrounded by a cladding or the like of a refractive index $n_2$ is given by the following formula:

$$NA = n_1 \sin \phi_{max} = \sqrt{n_1^2 - n_2^2} \qquad (2)$$

If the angle $\theta$ is made equal to $\phi_{max}$, then the extreme meridional ray will be reflected directly back on itself. But all other meridional rays will be reflected at angles greater than $\phi_{max}$, and, therefore, lost. The other limit is set by the fact if $n_1 \sin \theta = 1$, then the axial rays will be totally internally reflected at the end face.

Therefore, reasonable limits for the angular value of $\theta$ can be expressed as follows:

$$\theta > \sin^{-1} \sqrt{1 - \frac{n_2^2}{n_1^2}} \qquad (3)$$

and $$\theta < \sin^{-1} \frac{1}{n_1} \qquad (4)$$

For example, in the case wherein $n_1$ is equal to a refractive index of 1.523 and $n_2$ is equal to a refractive index of 1.5082, the limits are 8.0 degrees and 41 degrees. When an angle of 10 degrees for $\theta$ was used with a 6% neodymium doped barium crown glass as the core and a soda-lime silicate cladding, a signal amplification factor in the neighborhood of 10,000 was obtained.

In the above-mentioned co-pending application, there has been disclosed a large number of different core materials which may be doped by varying amounts of active laser material and also a large variety of transparent lower index materials which may be employed as claddings for effecting laser components. It should be appreciated, of course, the invention described herein is not restricted to the particular materials and examples set forth herein but can as readily be employed with the various combinations of materials suggested in said earlier co-pending application. In FIG. 5 is shown a fragmentary side elevational view of a fiber laser structure embodying the present invention and it will be appreciated that this figure shows a helically-coiled construction much like that shown in said earlier-filed application. The structure shown in this figure comprises a helically-coiled fiber laser component 91 for amplifying an input optical signal 93 and has several convolutes of the component arranged in surrounding relation to a transparent cylindrical member 94 for supporting same in concentric relation to a conventional flash tube 96. It will be noted, however, that the input end and the output end of this component 91 are both provided with sloping end surfaces 97 and 98, respectively, of controlled angular value as taught by the present invention so that optical gain in the output signal 99 will be obtained without having undesired oscillation due to internal reflection at either end surface occur.

While flat end surfaces have been repeatedly referred to above and in the claims which follow, it should be appreciated that substantially flat end surfaces, or even slightly curved end surfaces, could be employed instead upon the ends of the laser component, if desired, for accomplishing the purposes mentioned above. However, since it is considered that the providing of curved surfaces on such components would ordinarily be more difficult, particularly upon laser components of very small sizes, flat surfaces would generally be employed.

Having described our invention, we claim:

1. A laser amplifier structure for producing laser light amplification free from concurrent laser oscillation, said structure being in the form of an elongated component comprising a relatively thin elongated fiber core having smooth side wall portions throughout the length thereof and a cladding disposed in surrounding contacting relation with said side wall portions throughout the length of said core, said core being formed of a solid moldable transparent laser material of known kind and having a predetermined refractive index, said cladding being formed of a solid moldable material which is transparent to optical energy at the pumping wavelengths of said laser material and has a lower predetermined refractive index than that of said core, said core being a very large number of times greater in length than the transverse dimension thereof so as to act together with said cladding as a traveling wave type laser light amplifying structure for optical signals passing through said core from end to end thereof, said elongated component having formed on its opposite ends an optically finished flat entrance end surface for the admission of optical signals to be amplified and an optically finished flat exit end surface for allowing said optical signals after amplification to pass outwardly therethrough, at least one of said flat end surfaces being so angularly disposed upon said component and relative to an adjacent transverse plane outwardly thereof, and in normal relation to the longitudinal axis of said component at said angularly disposed end surface, that the included angle $\theta$ between said angularly disposed end surface and said transverse plane will have an angular value which is at least of such a value as to cause that portion of optical energy traveling generally longitudinally within the core and incident upon said angularly disposed end surface and being reflected thereby back into said core to have such a direction of travel as to pass out of said core and into said cladding through side wall portions thereof without experiencing total internal reflection at the side wall portions of said core, and said angularly disposed end surface also being so angularly disposed relative to said transverse plane that said included angle $\theta$ will have a lesser value than that at which optical energy traveling within said core and incident upon said angularly disposed end surface would be totally internally reflected thereby, the angular value of $\theta$ being numerically greater than that provided by the expression $$\sin^{-1} \sqrt{1 - \frac{n_2^2}{n_1^2}}$$

and also the angular value of $\theta$ being numerically less than that provided by the expression $$\sin^{-1} \frac{1}{n_1}$$

and wherein $n_1$ is the refractive index of the solid moldable material forming said laser core and $n_2$ is the refractive index of the solid moldable cladding material surrounding said core throughout the length thereof.

2. A laser amplifier as defined in claim 1 and wherein said solid, moldable laser material is a laser glass and said solid, moldable cladding is a transparent glass having a lower refractive index and having optical and physical characteristics compatible with said laser glass.

3. A laser amplifier as defined in claim 1 wherein said thin, elongated component is of such extended length that it may be formed into the shape of a helix having a plurality of convolutes for affecting a traveling wave-type laser amplifier structure.

4. A laser amplifier as defined in claim 1 having light-altering means carried by the side wall portions of said cladding and completely surrounding said cladding only at locations at and adjacent each angularly disposed flat end surface of said component, said light-altering means being disposed on the outer surface portion of said cladding and being of such a roughened character as to variously scatter light traveling within said cladding material which is incident thereon.

5. A laser amplifier as defined in claim 1 having light-altering means carried by the side wall portions of said cladding and completely surrounding said cladding only at locations at and adjacent each angularly disposed flat end surface of said component, said light-altering means being in the form of a coating of material of such a character as to absorb light traveling within said cladding and incident thereon.

6. A laser amplifier as defined in claim 1 and having light-altering means carried by the side wall portions of said cladding and completely surrounding said cladding only at locations at and adjacent each angularly disposed flat end surface of said component, said light-altering means including means disposed on the outer surface portion of said cladding and being of such a roughened character as to variously scatter light traveling within said cladding and incident thereon and also including material surrounding the roughened portion of said cladding and being of such a character as to absorb at least some of the light traveling within said cladding and incident thereon.

References Cited

UNITED STATES PATENTS

| | | | |
|---|---|---|---|
| 2,825,260 | 3,1958 | O'Brien | 88—1 |
| 3,056,031 | 8/1962 | McNaney | 250—227 X |
| 3,059,117 | 10/1962 | Boyle et al. | 331—94.5 |
| 3,162,822 | 12/1964 | Tackaberry | 331—94.5 |
| 3,179,899 | 4/1965 | Fox | 331—94.5 |
| 3,241,085 | 2/1966 | Marcatili | 331—94.5 |

FOREIGN PATENTS 1,323,829  3/1963  France.

JOHN K. CORBIN, *Primary Examiner.*

U.S. Cl. X.R.

331—94.5